United States Patent
Nepomniachtchi et al.

(10) Patent No.: US 8,452,098 B2
(45) Date of Patent: May 28, 2013

(54) METHOD FOR APPLYING A SIGNATURE SIMPLICITY ANALYSIS FOR IMPROVING THE ACCURACY OF SIGNATURE VALIDATION

(75) Inventors: Grigori Nepomniachtchi, San Diego, CA (US); Andrei Boutyline, San Diego, CA (US)

(73) Assignee: Mitek Systems, Inc., San Diego, CA (US)

( * ) Notice: Subject to any disclaimer, the term of this patent is extended or adjusted under 35 U.S.C. 154(b) by 154 days.

(21) Appl. No.: 12/873,151

(22) Filed: Aug. 31, 2010

(65) Prior Publication Data

US 2011/0052065 A1    Mar. 3, 2011

Related U.S. Application Data

(62) Division of application No. 11/447,673, filed on Jun. 6, 2006, now Pat. No. 7,787,695.

(51) Int. Cl.
*G06K 9/18*    (2006.01)
*G06K 9/22*    (2006.01)

(52) U.S. Cl.
CPC ..................................... *G06K 9/222* (2013.01)
USPC ........................................................ 382/186

(58) Field of Classification Search
CPC . G06K 9/222; G06K 9/00875; G06K 9/00405; G06K 9/6291; G06F 3/0487
See application file for complete search history.

(56) References Cited

U.S. PATENT DOCUMENTS 6,356,650 B1 * 3/2002 Wirtz ............................. 382/119

\* cited by examiner

*Primary Examiner* — Kim Vu
*Assistant Examiner* — Fred Hu
(74) *Attorney, Agent, or Firm* — Procopio, Cory, Hargreaves & Savitch LLP; Noel C. Gillespie (57) ABSTRACT

The present invention provides a method for applying a signature simplicity analysis for improving the accuracy of signature validation, the method including the steps of generating a plurality of synthetic fraudulent signatures for a person, encoding authentic signatures of the person using signature simplicity and validating the signatures using signature simplicity.

9 Claims, 6 Drawing Sheets

METHOD FOR APPLYING A SIGNATURE SIMPLICITY ANALYSIS FOR IMPROVING THE ACCURACY OF SIGNATURE VALIDATION

RELATED APPLICATIONS INFORMATION

This application claims priority as a divisional under 35 U.S.C. 120 to U.S. patent application Ser. No. 11/447,673 (now U.S. Pat. No. 7,787,695), filed Jun. 6, 2006, and entitled "Method for Applying a Signature Simplicity Analysis for Improving the Accuracy of Signature Validation," which is incorporated herein by reference in its entirety as if set forth in full.

BACKGROUND INFORMATION

1. Field of the Invention

This invention relates to automated document processing, and more particularly to a method for applying a signature simplicity analysis for improving the accuracy of signature validation.

2. Background of the Invention

Signature forgery is a widespread problem throughout the world, wherein the signatures of different people may be forged with a varying probability of success. In particular, there are three commonly accepted signature fraud scenarios, including: (1) random forgery; (2) casual forgery; and (3) skillful forgery. Random forgery occurs when the forger knows neither the victim's name nor the victim's authentic signature. Consequently, the fraudulent signature will likely have no relation to the authentic one. For example, the forger may sign using a signature other than that of the victim. Instances of random forgery are easy to detect using conventional "off-line" or "static" signature validation technology.

Casual forgery occurs when the forger knows the victim's name, but not the victim's signature. As a result, the fraudulent signature is in the name of the victim and therefore is likely to have some relation the victim's authentic signature. When dealing with casual forgery, the chances of producing a fraudulent signature that looks similar to the authentic one depends to a great extent on how close the authentic signature matches the person's name, which may be referred to herein in terms of "signature simplicity". Skillful forgery occurs when the forger knows the victim's name and signature, and may reproduce the signature with a relatively high resemblance to the authentic signature. Conventional "off-line" or "static" signature validation technology typically cannot detect forgery that falls in the skillful category.

In view of the above drawbacks, there exists a need for a method for applying a signature simplicity analysis for improving the accuracy of signature validation.

SUMMARY OF THE INVENTION

In view of the foregoing, it is an object of the present invention to provide a method for applying a signature simplicity analysis for improving the accuracy of signature validation.

One aspect of the present invention involves a preferred method for applying a signature simplicity analysis for improving the accuracy of signature validation, the method comprising the steps of generating a plurality of synthetic fraudulent signatures for a person, encoding authentic signatures of the person using signature simplicity and validating the signatures using signature simplicity. These steps may comprise a plurality of substeps, as set forth hereinbelow.

For the above-identified preferred method of the invention, the step of generating a plurality of synthetic fraudulent signatures for a person may comprise the steps of: (1) inputting a name of the person; (2) inputting a set of simulation parameters; (3) performing a name mangling process to generate a set of various name versions based on the simulation parameter; (4) selecting a set of available fonts based on the simulation parameters; (5) selecting a set of available font characteristics based on the simulation parameters; (6) generating a set of initial signature images; (7) performing an image mangling process on all the initial signature images to create a plurality of intermediate signature images; (8) removing any image duplicates; and (9) outputting a set of unique synthetic signatures representing the person's name. The name of the person may be inputted in a form of First M. Last. Additionally, the simulation parameters may comprise font selection, font characteristics, name mangling and image mangling. The set of various name versions may include ASCII data strings that represent name formats selected from the group consisting of: F. Last; Last; First La; and name synonyms. The step of generating a set of initial signature images may comprise employing the Win32 SDK to generate a bitmap including the various name versions combined with the font selections.

In the preferred method, the step of encoding authentic signatures using signature simplicity may include the steps of: (1) inputting a set of authentic signatures of the person; (2) inputting a name of the person and generating synthetic fraudulent signatures based on the name; (3) creating an initial signature code for the person; (4) validating the set of synthetic fraudulent signatures against the signature code; (5) selecting synthetic fraudulent signatures that yield the highest confidence against the signature code using a set of simulation parameters as seeds to produce an updated set of synthetic fraudulent signatures; (6) validating the updated set of synthetic fraudulent signatures against the initial signature code; and (7) producing an adjusted signature code. The step of inputting a set of authentic signatures may involve the use of signatures located on checks or signature snippets. In addition, the step of creating the initial signature code may include the use of signature encoding software for creating a unique signature code comprising a string of data representing integral characteristics of the person's signatures and a person-specific confidence threshold. Further, the step of validating the set of synthetic fraudulent signatures may comprise validating the signatures against the initial signature code to form a set of simulation parameters that yield the highest confidence at a selected threshold value. Moreover, the step of validating the updated set of synthetic fraudulent signatures against the initial signature code may involve the use of signature validation software to compute how many synthetic fraudulent signatures yield high confidence at a selected threshold value.

With respect to the preferred method of the invention, the step of validating the synthetic fraudulent signatures using signature simplicity may comprise the steps of: (1) inputting an adjusted signature code for the person; (2) inputting an authentic signature to validate the adjusted signature code; (3) extracting a simplicity score of the signature from the adjusted signature code; (4) extracting an initial signature code of the person from the adjusted signature code; and (5) validating the input signature against the initial signature code. The step of validating the input signature against the initial signature code may be performed using signature validation software for scanning and validating the input signature against information stored in the initial signature code, and outputting an initial confidence score. Additionally, the method may further comprise the step of adjusting the initial confidence score taking into account the simplicity score to produce an output in the form of an adjusted signature confidence score.

Another aspect of the present invention involves a method for creating a set of unique synthetic signatures representing a person's name, comprising the steps of: (1) inputting a name of a person and a set of simulation parameters; (2) performing an image mangling process to generate a set of various name versions based on the simulation parameter; (3) selecting a set of available fonts and font characteristics based on the simulation parameters; (4) generating a set of initial signature images; (5) performing an image mangling process on all the initial signature images to create a plurality of intermediate signature images; and (6) outputting a set of unique synthetic signatures representing the person's name. According to the preferred embodiment, the simulation parameters may comprise font selection, font characteristics, name mangling and image mangling. In addition, the set of various name versions may comprise ASCII data strings that represent name formats selected from the group consisting of: F. Last; Last; First La; and name synonyms.

Additional aspects of the present invention involve a method for producing an adjusted signature code and a method for validating the adjusted signature code. In particular, the method for producing an adjusted signature code comprises the steps of: (1) inputting a set of authentic signatures of the person; (2) inputting a name of the person; (3) creating an initial signature cod~ for the person; (4) validating the set of synthetic fraudulent signatures against the initial signature code; (5) using a set of simulation parameters as seeds to produce an updated set of synthetic fraudulent signatures; (6) validating the updated set of synthetic fraudulent signatures against the initial signature code; and (7) producing an adjusted signature code. In addition, the validation method may comprise the steps of: (1) inputting an adjusted signature code for the person; (2) inputting an authentic signature to validate the adjusted signature code; (3) extracting a simplicity score of the signature from the adjusted signature code; (4) extracting an initial signature code of the person from the adjusted signature code; (5) validating the input signature against the initial signature code; and (6) adjusting the initial signature confidence based on the simplicity score.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to anyone of the embodiments of the invention described herein, and any equivalents. Furthermore, reference to various feature(s) of the "present invention" throughout this document does not mean that all claimed embodiments or methods must include the referenced feature(s).

The present invention provides a method for improving the accuracy of a signature validation system by applying a signature simplicity analysis based upon synthetic fraudulent signatures. In particular, the method is adapted to detect signature forgeries that fall into the casual and skillful categories, which cannot be detected using conventional "off-line" or "static" signature validation technology. The method comprises generating a plurality of synthetic fraudulent signatures for a person, encoding authentic signatures using signature simplicity and validating the signatures using signature simplicity With respect to casual forgery, the likelihood of producing a fraudulent signature that closely resembles the authentic one largely depends on how close the authentic signature matches the person's name. Casual forgery is also referred to herein as "simple forgery". In addition, signatures that closely match the person's name are referred to herein as "simplistic signatures", while a numeric value which reflects the level of simplicity of a signature is referred to herein as a "simplicity score". Particularly, on a scale from 0 to 100, a simplicity score of 0 is indicative of "no signature-to-name resemblance", while a value of 100 is indicative of an absolute resemblance. In this respect, a high-simplicity signature having a simplicity score of 100 literally reads the person's name. The simplicity score may be defined as the average percentage of letters in person's name that can be clearly read from the person's signatures. In general, simplicity scores vary significantly from person to person.

Figure 1:
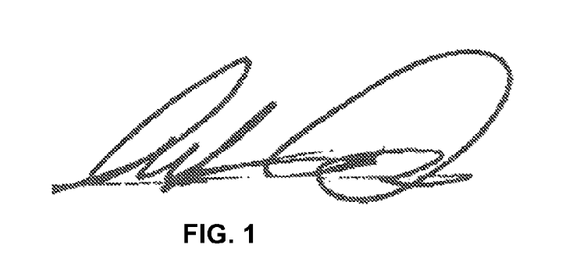
FIG. 1 illustrates a low-simplicity signature of "Anthony Osborne"
Figure 2:
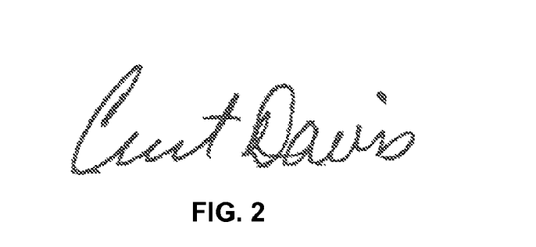
FIG. 2 illustrates a high-simplicity signature of "Curt Davis"

Referring to FIGS. 1 and 2, examples of low-simplicity and high-simplicity signatures are provided, respectfully. In FIG. 1, the signature of "Anthony Osborne" does not read the specified name and for that reason yields a relatively low simplicity score. Since the likelihood of producing a fraudulent signature that closely resembles the authentic one largely depends on how close the authentic signature matches the person's name, the signature of "Anthony Osborne" would be extremely difficult to successfully forge. Contrariwise, as depicted in FIG. 2, the signature of "Curt Davis" reads the specified name and therefore generates a relatively high simplicity score. Consequently, the signature of "Curt Davis" would be relatively easy to successfully forge.

The ability to programmatically produce a simplicity score given a set of authentic signatures is important in order to protect people with simplistic signatures from fraud. In accordance with the principles of the invention, the protection may be in a form of an automatic person-specific adjustment of a confidence threshold produced by a signature validation engine, as described hereinbelow. Person-specific adjustments significantly improve the percentage of falsely accepted signatures and falsely rejected signatures for individuals enrolled in a signature validation system. As discussed below, these person-specific adjustments may be generated at the encoding stage and applied at the validation stage of the signature validation system. In essence, the person-specific adjustments alter the decision-making process on an individual basis and result in significantly improving overall accuracy of the signature validation system.

According to the invention, there exist several primary "uniqueness" factors that are considered when developing person-specific adjustments for the signatures of different individuals. These signature uniqueness factors may include, but are not limited to a level of simplicity of the signature and a level of variability of the signature. The present invention is directed to quantifying both of the uniqueness factors set forth above. Specifically, the level of simplicity of the signature affects the confidence threshold, while the level of variability of the signature results in assigning different person-specific weights to individual signature features.

Figure 3:
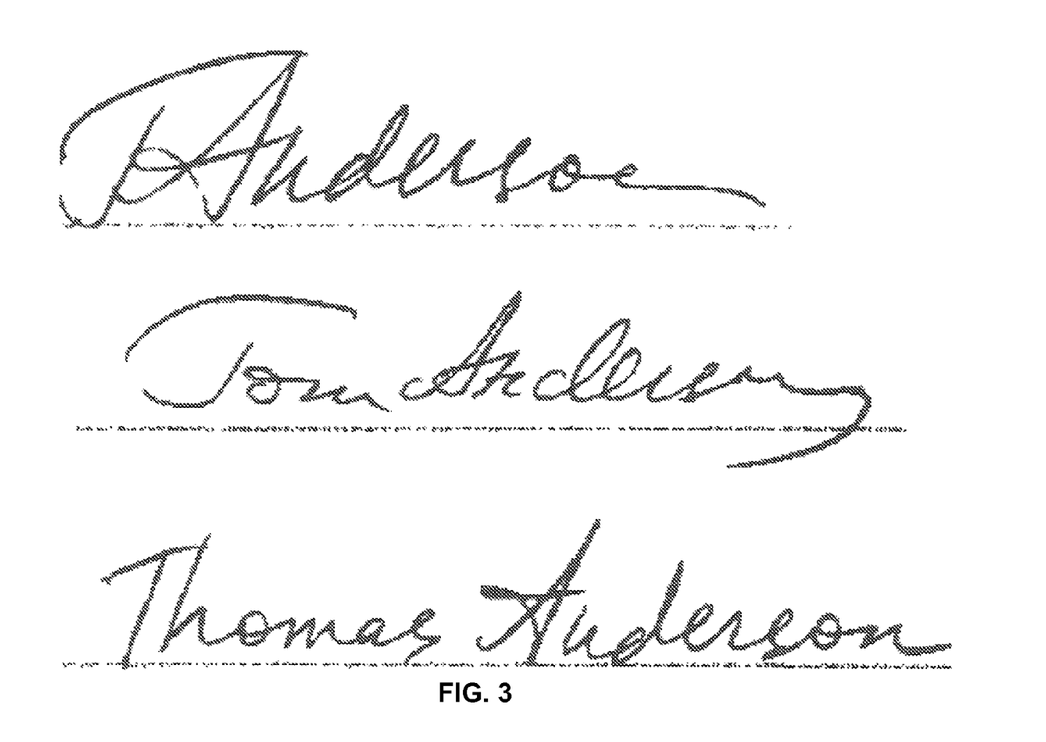
FIG. 3 illustrates three instances of a high-variability signature of "Thomas Anderson", wherein the signature is significantly different in each instance.

FIG. 3 illustrates three instances of a high-variability signature of "Thomas Anderson", wherein the signature is significantly different in each instance. If a particular feature of a signature has high level of variability (i.e., a low level of consistency), the weight of the feature should be reduced. Conversely, a feature with low variability (i.e., a high level of consistency) carries more useful information and should be assigned a higher weight. Various algorithms for computing signature simplicity scores are described hereinbelow. In this regard, the signature complexity score is defined as (100−signature simplicity score), wherein the signature simplicity score is measured as a percentage. The signature complexity score ("complexity") will be employed in the computations of threshold adjustments provided below.

In accordance with the principles of the invention, a method of assessing signature variability for computing person-specific confidence thresholds is provided. Of course, more than one authentic signature must be available in order to measure signature variability. According to a preferred embodiment, at least 5 authentic signatures are used to assess signature variability. An initial step comprises building a feature vector for each signature, wherein, feature vectors $F_1$, $F_2$, ... $F_N$, are calculated for each person, wherein N is the number of signatures. The next step involves computing confidences $C(i,j)=C(F_i, F_j)$ for each pair of different signatures {I<J}, as described hereinabove. The next step involves computing the standard deviation within the following set of confidences:

(1) Sum=$\Sigma C(I,J)$(over all I<J);
(2) SumSq=$\Sigma(C(I,J)*C(I,J))$(over all I<J);
(3) Var=$(SumSq-((Sum*Sum)/P))/P$, where P is the number of pairs with I<J: $P=N*(N-1)/2$, where N is the number of signatures; and
(4) V=sqrt(Var), where V is the standard deviation used to represent the variability in question.

Once the signature variability and average signature complexity have been determined, one can compute a person-specific confidence threshold, wherein:

Threshold=AveThr−$W1$*ComplexityDelta−$W2$*VariabilityDelta;

where AveThr is the average threshold value, experimentally established as 67 (on a 0-100 scale);
where ComplexityDelta is computed as (C−AveComplexity), where AveComplexity is average complexity of signatures (established experimentally);
where VariabilityDelta is computed as (V−AveVariability), where AveVariability is average variability of the same person's signatures (established experimentally); and
where the weights W1 and W2 are some positive values that are established experimentally according to the trade-off between false positive and false negative rates.

The above-described person-specific confidence threshold formula will now be considered in view of the following cases. In the case where both deltas are approximately 0, the person has a substantially standard signing style, wherein Threshold is approximately equal to AveThr. In the case where ComplexityDelta is approximately 0, but the VariabilityDelta is substantially greater than 0, the person has an inconsistent signing style such that the signatures do not closely match each other. Since W2 is a positive value preceded by a minus sign, the Threshold will become less than AveThr. Thus, to avoid too many false rejections of this user's signature (due to the high variability), the person-specific confidence threshold should be lowered in this instance. In the case where ComplexityDelta is approximately 0, but the VariabilityDelta is much smaller than 0, the person has a consistent signing style and the signatures very closely match each other). Since W2 is a positive value preceded by minus sign, the Threshold will become greater than AveThr. Thus, the person-specific confidence threshold may be increased to reduce the number of false acceptances (false positive decisions), yet not significantly increase the occurrence of false negative decisions.

In the case where VariabilityDelta is 0, but ComplexityDelta is much greater than 0, the person has a very complex signature. Since WI is a positive value preceded by minus sign, the Threshold will become smaller than AveThr. In this example, to avoid too many false rejections (false negative decisions) of this user's signature because of the high complexity, the person-specific confidence threshold should be lowered. However, the chance of a false positive decision doesn't increase much since the signature is complex and therefore difficult to forge. In the case where VariabilityDelta is 0, but the ComplexityDelta is much smaller than 0, the person has very simple signature. Since WI is a positive value preceded by minus sign, the Threshold will become greater than AveThr. In this example, the person-specific confidence threshold should be increased to reduce the number of false positive decisions since the signature is simple and therefore easy-to-forge. Increasing the threshold does not significantly increase the chance of false negative decisions since the signature is simple and the authentic person will likely be able to produce a consistent signature.

Figure 4:
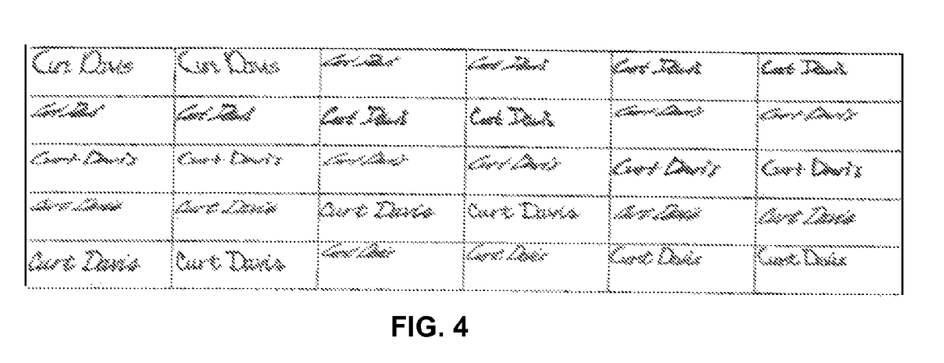
FIG. 4 illustrates a plurality of synthetic fraudulent signatures for "Curt Davis", wherein each synthetic fraudulent signature is a simplistic signature that closely matches the person's actual name.

In accordance with the invention, a plurality of synthetic fraudulent signatures may be created and employed in measuring signature simplicity. Quantifying signature simplicity is preferably based upon the generation of a large set of synthetic fraudulent signatures that are as close to the person's name as possible. By way of example, FIG. 4 illustrates 30 synthetic fraudulent signatures for "Curt Davis", wherein each synthetic fraudulent signature closely matches the authentic signature(s), resulting in a high simplicity score.

When a large enough set of synthetic fraudulent signatures is available, the methods of the invention can be employed to reliably measure a corresponding synthetic false accept rate, which is used as an indicator of signature simplicity score. In general, higher simplicity scores are assigned to signatures having higher synthetic false accept rates. Consequently, the simplicity score may be defined as a monotonic function of the corresponding synthetic false accept rate at a pre-defined confidence threshold. For example, the simplicity score may be defined as the synthetic false accept rate (in percents) at a threshold value of 500.

Figure 5:
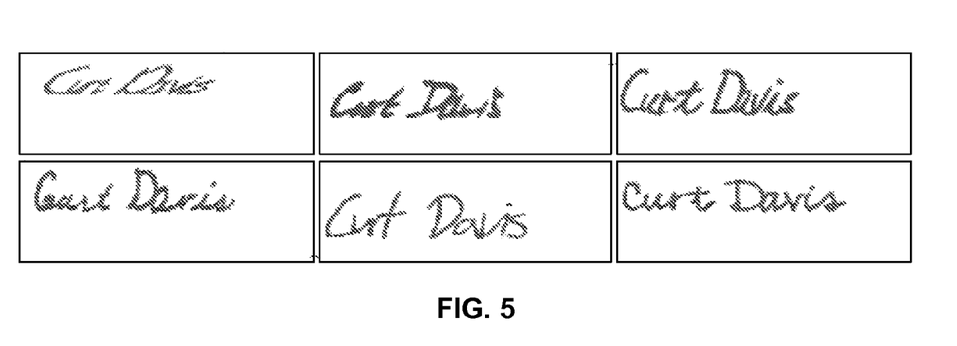
FIG. 5 depicts the name "Curt Davis" generated using six different cursive fonts.

While generating synthetic fraudulent signatures, it is important to produce as many different signatures types and styles as possible. In accordance with the invention a preferred algorithm for generating synthetic fraudulent signatures utilizes simulation parameters that fall into various categories, including: (1) font selection; (2) font characteristics; (3) name mangling; and (4) image mangling. With respect to font selection, the algorithm may employ cursive Windows fonts that produce text similar to handwriting. Alternatively, there are dozens of cursive fonts available on the market that may be used in lieu of, or in addition to, the Windows fonts. FIG. 5 depicts the name "Curt Davis" generated using six different cursive fonts. By altering the font, signature bitmaps are generated that are distinctively different from each other.

Figure 6:
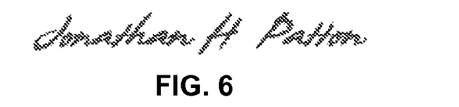
FIG. 6 illustrates an originally generated signature of "Jonathan H. Patton"
Figure 7:
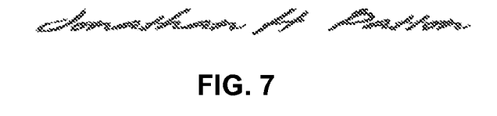
FIG. 7 illustrates the signature of FIG. 6, wherein the aspect ratio has been modified.
Figure 8:
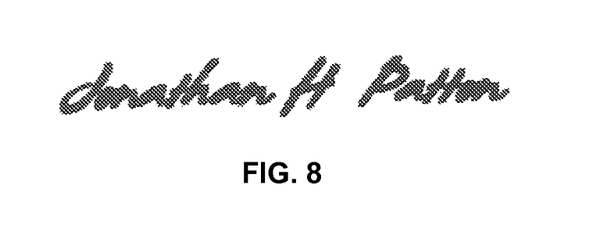
FIG. 8 illustrates the signature of FIG. 6, wherein the boldness has been altered.

Turning now to the font characteristics simulation parameter, the preferred algorithm for generating synthetic fraudulent signatures allows different font characteristics to be varied, including: (1) slant; (2) boldness; (3) size; and (4) aspect ratio. FIGS. 6-8 are provided to illustrate changes in font characteristics. Particularly, FIG. 6 illustrates the originally generated signature of "Jonathan H. Patton", FIG. 7 illustrates the signature wherein the aspect ratio has been modified, and FIG. 8 illustrates the signature wherein the boldness has been altered.

Figure 9:
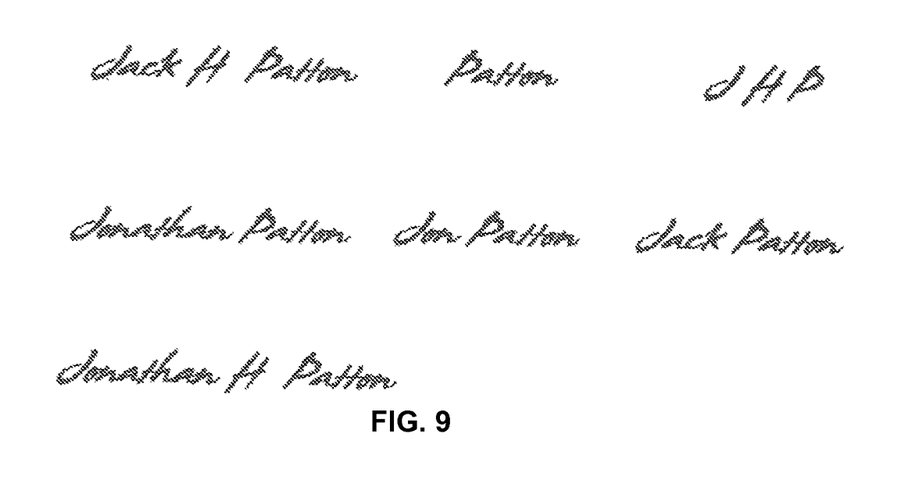
FIG. 9 depicts various synthetic fraudulent signatures of "Jonathan Patton" generated using the name mangling simulation parameter of the present invention.

Regarding name mangling, the preferred algorithm for generating synthetic fraudulent signatures is adapted to consider a plurality of name variations. Given a name in the form "First M. Last", the algorithm preferably considers variations including, but not limited to: (1) First M. Last; (2) F. Last; (3) Last; (4) writing only part of the name (e.g., First La); and name synonyms (e.g., William=Bill & Jonathan=Jon). Referring to FIG. 9, various synthetic fraudulent signatures are generated by the preferred algorithm for "Jonathan H. Patton" using the name mangling simulation parameter. In particular, the variations include "Jonathan H. Patton", "Jonathan Patton", "Jack H. Patton", "Patton", "Jon Patton", "Jack Patton" and "J H P".

Figure 10:
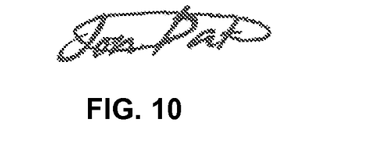
FIG. 10 illustrates the name "Jon Patton", wherein a tail is attached and the last half of the last name is omitted.

With respect to image mangling, different tails are attached to the end of some signatures. This type of signature transformation may be applied in combination with writing only part of the person's last name. For example, referring to FIG. 10, a tail is attached to the name "Jon Patton", wherein the last half of the last name is omitted.

Figure 11:
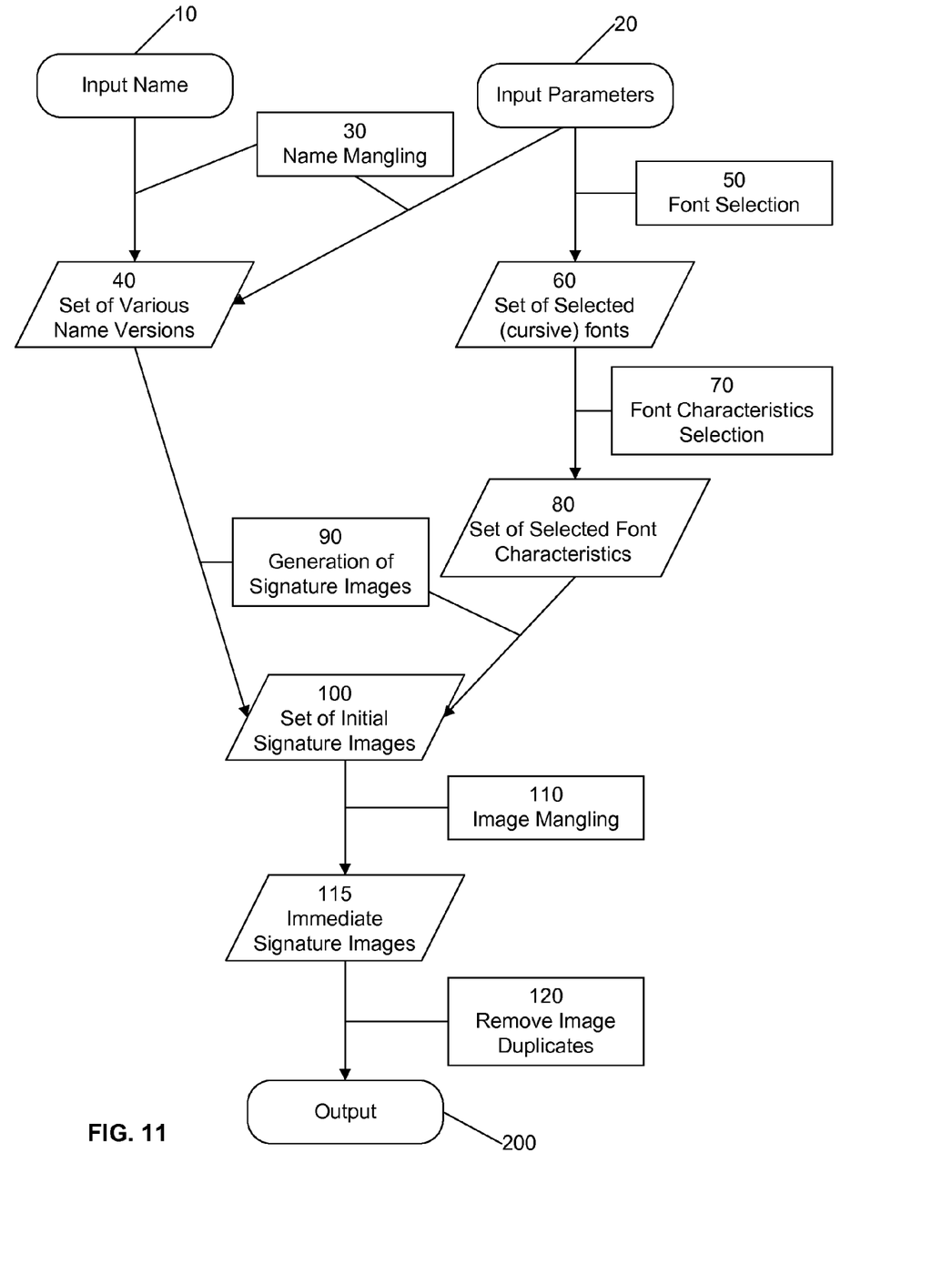
FIG. 11 is a flowchart illustrating synthetic fraudulent signatures generation in accordance with the preferred method of the invention.
Figure 12:
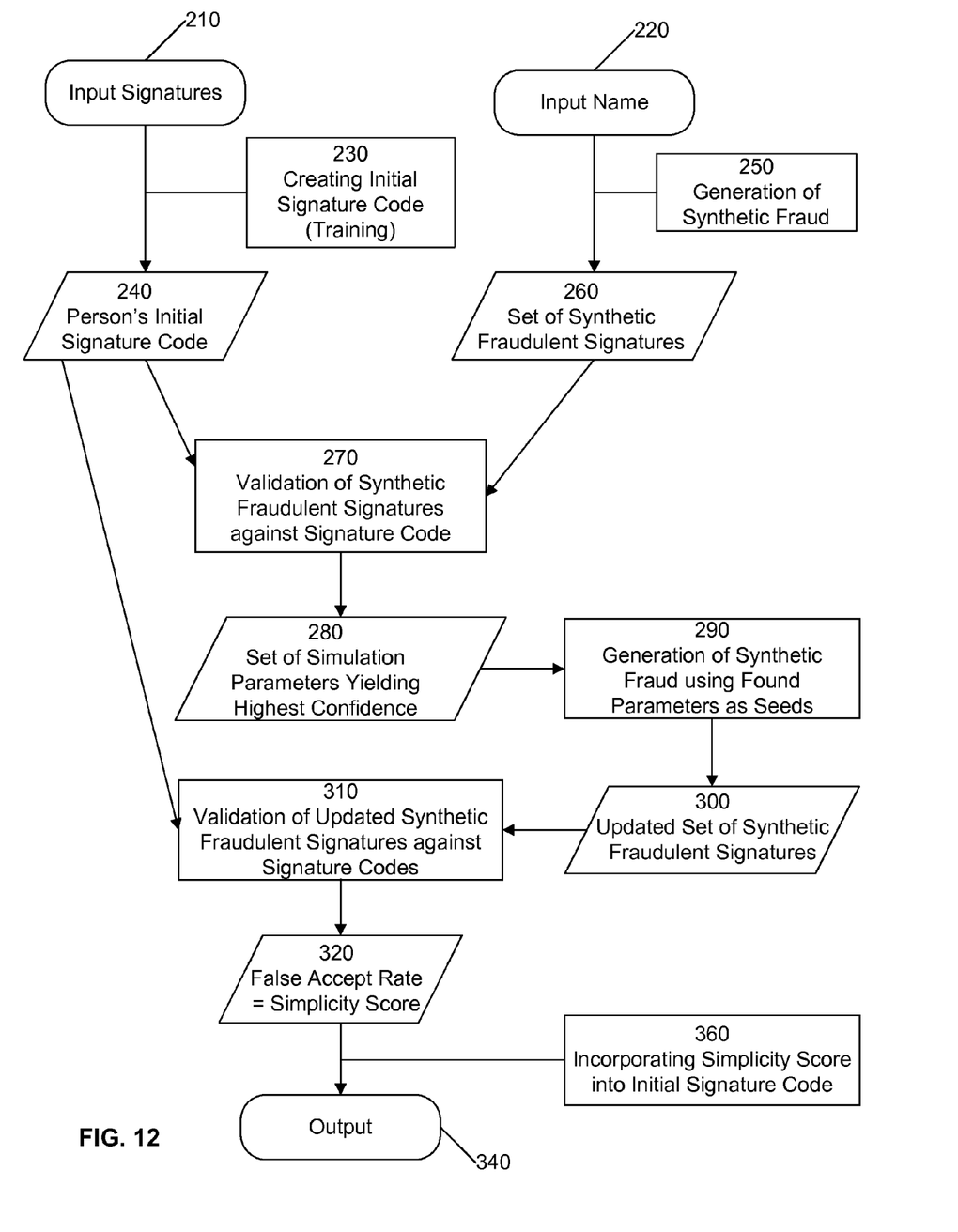
FIG. 12 is a flowchart illustrating signature encoding using signature simplicity generation in accordance with the preferred method of the invention.
Figure 13:
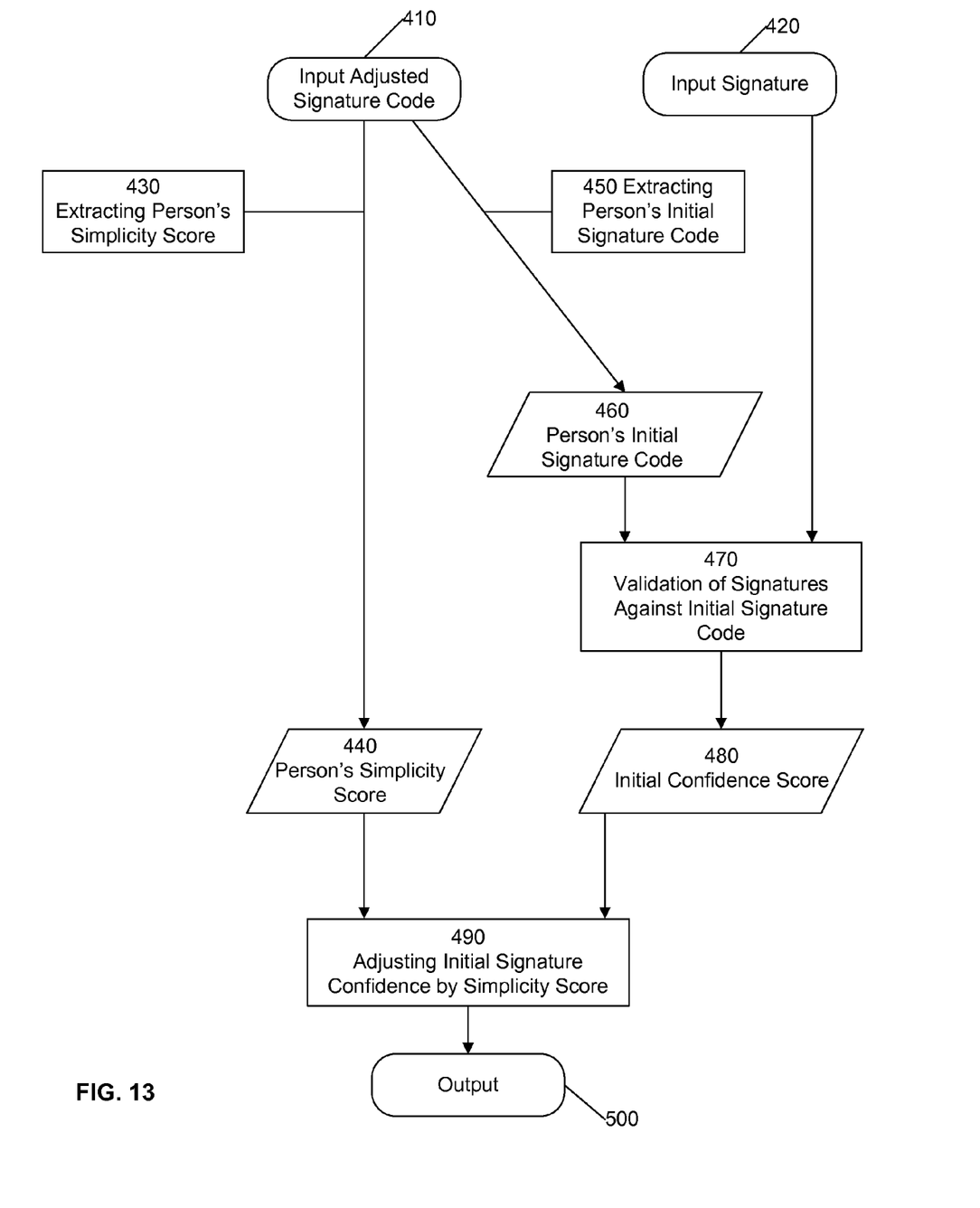
FIG. 13 is a flowchart illustrating signature validation using signature simplicity generation in accordance with the preferred method of the invention.

Referring to FIGS. 11-13, a preferred method for applying a signature simplicity analysis for improving the accuracy of signature validation using the algorithm of the invention will now be described. In particular, the method involves: (1) synthetic fraudulent signature generation (FIG. 11); (2) signature encoding using signature simplicity (FIG. 12); and (3) signature validation using signature simplicity (FIG. 13). As depicted in FIG. 11, synthetic fraudulent signature generation begins with inputting a person's name (step 10), for example in the form of "First M. Last". Step 20 involves inputting a set of simulation parameters. In a preferred implementation of the invention, the simulation parameters include: (1) font selection; (2) font characteristics; (3) name mangling; and (4) image mangling. Of course, as would be appreciated by those of ordinary skill in the art, many different name formats and simulation parameters may be selected as inputs without departing from the scope of the invention In step 30, the algorithm performs a name mangling process in which it generates a set of various name versions 40 based on the selected simulation parameters. By way of example, the set of various name versions 40 may comprise ASCII data strings that represent names having the following formats: (1) First M. Last; (2) F. Last; (3) Last; (4) writing only part of the name (e.g., First La); and (5) name synonyms (e.g., William=Bill, Jonathan=Jon). Step 50 involves the selection of a set of available fonts 60 (e.g., cursive) based on the simulation parameters, whereas step 70 involves the selection of a set of available font characteristics 80 based on the chosen simulation parameters.

With further reference to FIG. 11, step 90 involves the generation of a set of initial signature images 100. For example, a Win32 SDK may be employed to generate a bitmap including the set of various name versions 40 combined with the font selections 80. Step 110 involves image mangling of all the initial signature images 100 to create a plurality of intermediate signature images 115, while step 120 involves removing any image duplicates (depending on the name versions 40 and font selections 80, some of the bitmaps in 110 may be identical). The output 200 may comprise a set of unique synthetic signatures representing the person's name.

FIG. 12 illustrates the signature encoding stage of the preferred method for applying a signature simplicity analysis for improving the accuracy of signature validation using the algorithm of the invention. More particularly, the signature encoding stage comprises a 2-phase simulation process, wherein the first phase is configured to produce as many distinctive signatures as possible, and the second phase is configured to produce signatures that are close to the authentic ones. In step 210, the signature encoding stage begins with inputting a set of a person's authentic signatures, for example using signatures located on checks or signature snippets. Step 220 involves inputting the person's name in form of "First M. Last".

With further reference to FIG. 12, step 230 involves creating the person's initial signature code 240. This step may involve the use of signature encoding software for creating a unique signature code 240 comprising a string of data representing the integral characteristics of the person's signatures and a person-specific confidence threshold. According to some embodiments, the signature code 240 may be created using a signature encoding algorithm that converts the signature images into the machine-readable data strings. Step 250 involves the generation of a set of synthetic fraudulent signatures 260 as set forth hereinabove. In step 270, the set of synthetic fraudulent signatures 260 is validated against the person's initial signature code 240 to form a set of simulation parameters 280 that yield the highest confidence at a selected threshold value. As an example, the false accept rate may be used as the simplicity score. Signature validation may involve signature validation software that is embedded into a device such as a scanner for scanning and validating the set of synthetic fraudulent signatures 260 against the information stored in the signature code 240 and outputting a confidence value indicating whether a synthetic fraudulent signature is an authentic signature.

In the second phase of the signature encoding stage, the algorithm is configured to produce signatures that are close to the authentic ones. Particularly, step 290 involves a second round of fraud generation, wherein the set of simulation parameters 280 are used as seeds to produce an updated set of synthetic fraudulent signatures 300 with a stronger resemblance to the authentic signatures. Step 310 involves the validation of the updated set of synthetic fraudulent signatures 300 against the initial signature code 240 using the signature validation software to compute how many synthetic fraudulent signatures yield high confidence at the selected threshold value, wherein the false accept rate equals the simplicity score 320. Step 330 involves incorporating the simplicity score 320 into the initial signature code 240 to produce an output 340 in the form of an adjusted signature code 340.

FIG. 13 illustrates the signature validation stage of the preferred method for applying a signature simplicity analysis for improving the accuracy of signature validation using• the algorithm of the invention. Specifically, step 410 involves inputting the person's adjusted signature code 340, and step 420 involves inputting a signature (e.g., a signature bitmap) to validate the adjusted signature code 340. Step 430 involves extracting the person's simplicity score 440 from the adjusted signature code 340, whereas step 450 involves extracting the person's initial signature code 460 from the adjusted signature code 340.

In step 470, the input signature 420 is validated against the initial signature code 460, for example using the signature validation software for scanning and validating the input signature 420 against the information stored in the initial signature code 460, and outputting an initial confidence score 480. Step 490 involves adjusting the initial confidence score 480 taking into account the person's simplicity score 440 to produce an output 500 in the form of an adjusted signature confidence score 500.

Thus, it is seen that a method for applying a signature simplicity analysis for improving the accuracy of signature validation is provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

What is claimed is:

1. A method for applying a signature simplicity analysis for improving the accuracy of signature validation, comprising the steps of:
    using a computer system to generate a plurality of synthetic fraudulent signatures for a person;
    encoding authentic signatures of the person using signature simplicity; and
    validating the signatures using signature simplicity;
    wherein the step of encoding authentic signatures using signature simplicity comprises the steps of:
        inputting a set of authentic signatures of the person;
        inputting a name of the person;
        creating an initial signature code for the person;
        validating the set of synthetic fraudulent signatures;
        using a set of simulation parameters as seeds to produce an updated set of synthetic fraudulent signatures;
        validating the updated set of synthetic fraudulent signatures against the initial signature code; and
        producing an adjusted signature code.

2. The method of claim 1, wherein the step of inputting a set of authentic signatures involves the use of signatures located on checks or signature snippets.

3. The method of claim 1, wherein the name of the person is inputted in a form of First M. Last.

4. The method of claim 1, wherein the step of creating the initial signature code involves the use of signature encoding software for creating a unique signature code comprising a string of data representing integral characteristics of the person's signatures and a person-specific confidence threshold.

5. The method of claim 1, wherein the step of validating the set of synthetic fraudulent signatures comprises validating the signatures against the initial signature code to form a set of simulation parameters that yield the highest confidence at a selected threshold value.

6. The method of claim 1, wherein the step of validating the updated set of synthetic fraudulent signatures against the initial signature code involves the use of signature validation software to compute how many synthetic fraudulent signatures yield high confidence at a selected threshold value.

7. The method of claim 1, wherein the step of validating the synthetic fraudulent signatures using signature simplicity comprises the steps of:
    inputting an adjusted signature code for the person;
    inputting an authentic signature to validate the adjusted signature code;
    extracting a simplicity score of the signature from the adjusted signature code;
    extracting an initial signature code of the person from the adjusted signature code; and
    validating the input signature against the initial signature code.

8. The method of claim 7, wherein the step of validating the input signature against the initial signature code is performed using signature validation software for scanning and validating the input signature against information stored in the initial signature code, and outputting an initial confidence score.

9. The method of claim 8, further comprising the step of adjusting the initial confidence score taking into account the simplicity score to produce an output in the form of an adjusted signature confidence score.

\* \* \* \* \*